United States Patent Office 2,983,644
Patented May 9, 1961

2,983,644
PESTICIDAL COMPOSITIONS COMPRISING PHOSPHINOTHIOYL DISULFIDE

Joe R. Willard, Middleport, N.Y., James Forrest Allen, South Charleston, W. Va., and Kenneth R. Holden, East Point, Ga., assignors to Food Machinery and Chemical Corporation, New York, N.Y., a corporation of Delaware No Drawing. Filed Aug. 18, 1955, Ser. No. 529,358

4 Claims. (Cl. 167—22)

This invention relates to pesticidal compositions. In one of its more particular aspects this invention relates to the use of phosphinothioyl disulfides in pesticidal compositions. In another of its more particular aspects this invention relates to an improved process for the preparation of phosphinothioyl disulfides. In still another aspect this invention relates to a method of exterminating pests.

The phosphinothioyl disulfides of this invention are the disulfides derived from secondary esters of dithiophosphoric acids and may be represented by the general formula:

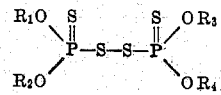

wherein $R_1$, $R_2$, $R_3$ and $R_4$ may be any hydrocarbon or substituted hydrocarbon radicals and may be the same or different.

Methods for the preparation of those disulfides in which the R's are all the same are known to the art, but the preparation of mixed disulfides, i.e. those in which at least one of the R groups is different from the others, has not previously been disclosed.

It is an object of this invention to provide a method for the preparation of phosphinothioyl disulfides having mixed alkoxy groups or aryloxy groups.

Another object of this invention is to provide new compositions of matter useful as pesticides.

Still another object of this invention is to provide an improved method for killing pests.

Other objects and advantages of this invention will become apparent in the course of the following detailed description and disclosure.

Phosphinothioyl disulfides in which one or more of the alkoxy groups or aryloxy groups are different from the others may be prepared according to the process of this invention in a two step reaction sequence described as follows:

(1) A mixture of alcohols and/or phenols is reacted with phosphorus pentasulfide to give a mixture of phosphorodithioates having the general formula:

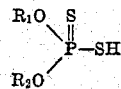

in which $R_1$ and $R_2$ may be any hydrocarbon or substituted hydrocarbon radicals and may be the same or different.

(2) A phosphorodithioate or mixture of phosphorodithioates is oxidized to give a phosphinothioyl disulfide or a mixture of phosphinothioyl disulfides having the general formula:

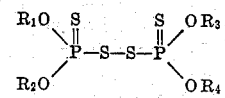

in which $R_1$, $R_2$, $R_3$ and $R_4$ may be any hydrocarbon or substituted hydrocarbon radicals.

Suitable oxidizing agents for this conversion are nitrous acid, nitric acid, chromic acid, oxides of nitrogen, such as are produced by the action of a strong mineral acid upon an alkali metal nitrite, hydrogen peroxide, chlorine, iodine, metallic persulfates, and the like.

To illustrate the preparation of a mixture of bis(dialkoxyphosphinothioyl) disulfides using the process of this invention, a mixture of ethanol and 2-propanol gives a mixture of three phosphorodithioates upon treatment with phosphorus pentasulfide, according to the following equations:

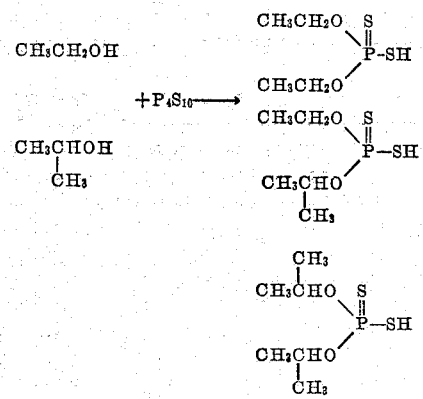

Upon oxidation with sodium nitrite and sulfuric acid these three phosphorodithioates would give a mixture of the following six disulfides:

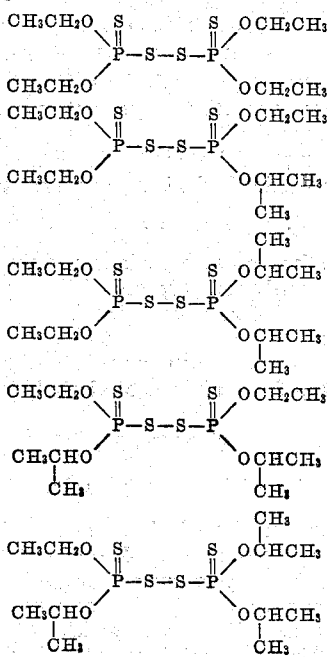

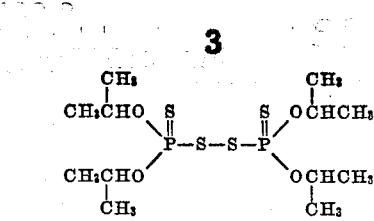

This method may be used to produce mixtures of phosphinothioyl disulfides of varying compositions by varying the proportions of the alcohols or phenols used in the preparation of the phosphorodithioates or by varying the proportions of the phosphorodithioates used in the preparation of the disulfides.

In addition to bis(dialkoxyphosphinothioyl) disulfides, bis(diaryloxyphosphinothioyl) disulfides as well as compounds in which there are both alkoxy and aryloxy groups in the same molecule may be prepared by the method of this invention.

The phosphinothioyl disulfides having mixed R groups have been found to display a pronounced increase in pesticidal activity over those compounds in which all the R groups are the same. The phosphinothioyl disulfides derived from the phosphorodithioates prepared from an equimolar mixture of ethanol and 2-propanol, for example, displayed an activity against mites which was twice as great as the pesticidal activity of bis(diethoxyphosphinothioyl) disufide and at least twenty times as great as the activity of bis(di-2-propoxyphosphinothioyl) disulfide.

These compounds may be applied to plant foliage or to other surfaces infested by pests in the form of sprays, or as dust compositions, or as baits. An aqueous suspension of a wettable powder formulation of the disulfide or mixture of disulfides on an inert carrier has been found to be suitable in the spray technique. Carriers suitable for both sprays and dusts include attaclay, silica, kaolin clay, talc, calcium carbonate and similar inert diluents. It is generally found preferable to utilize highly absorbent diluents where diluent is to be used in sprays with high concentrations of up to about 25% of the disulfide whereas diluents of low absorbent power are satisfactory in the case of lower concentrations of disulfide.

It is desirable to use wetting or emulsifying agents in the dispersions of the disulfides in order to obtain uniformity and stability of dispersion. The use of wetting agents also facilitates the application of the spray by increasing the spreading action of the composition, resulting in better contact with the surface being treated, and consequently effecting better contact with the mites, aphids, or other pests.

Baits are prepared by mixing the phosphinothioyl disulfides with a suitable feed, such as a mixture of cornmeal and sugar.

The preparation and pesticidal activity of representative compounds is shown in the following examples, which are intended solely for purposes of illustration and are not to be construed as in any way limiting the scope of this invention.

Example 1 illustrates the preparation of hydrogen phosphorodithioates from mixtures of alcohols or phenols.

EXAMPLE 1

Preparation of hydrogen phosphorodithioates

One molar quantity of phosphorus pentasulfide was placed in a roundbottomed flask equipped with a reflux condenser and dropping funnel and surrounded by a water-bath and connected with an absorber for the evolved hydrogen sulfide. Two molar quantities of each of the alcohols or phenols used was added rapidly and the initial vigorous exothermic reaction allowed to proceed at 40° C. until evolution of hydrogen sulfide had nearly ceased. The temperature of the water bath was then raised to boiling and heating continued until gas evolution again ceased. The liquid reaction mixture was filtered to remove traces of unreacted phosphorus pentasulfide. A list of the alcohols and phenols used and yields obtained is given in Table I.

TABLE I.—HYDROGEN PHOSPHORODITHIOATES

| Alcohol or phenol | Alcohol or phenol | Yield, Percent | Characteristics |
|---|---|---|---|
| methanol | 1-propanol | 83 | light green. |
| Do | do | 85 | very pale green. |
| Do | 1-butanol | 87 | Do. |
| Do | 2-methylpropanol-1 | 85 | light green. |
| Do | 2-butanol | 85 | deep blue-brown. |
| Do | cyclohexanol | 69 | colorless, viscous. |
| Do | allyl alcohol | 86 | viscous, colorless [a]. |
| Do | 2,2,2-trichloroethanol | 83 | dark red-brown. |
| ethanol | 2-methylpropanol-1 | 90 | dark green-brown. |
| Do | 2-butanol | 86 | pale orange-brown. |
| Do | allyl alcohol | 80 | medium green-brown [a] |
| Do | 2-propanol | 96–98 | pale green-brown. |
| Do | cyclohexanol | 92 | pale yellow. |
| Do | 3-pentanol | 93 | pale blue-gray. |
| Do | 3-heptanol | 91 | Do. |
| Do | 2-hexanol | 92 | medium blue-gray. |
| Do | phenol | [b] | |
| Do | 4-chlorophenol | [b] | |
| 1-propanol | 2-butanol | 76 | light orange-brown. |
| Do | 2-chloroethanol | 88 | viscous, colorless, [c]. |
| 2-propanol | 1-butanol | 89 | medium green-brown. |
| Do | 2-methylpropanol-1 | 90 | dark blue-brown. |
| Do | 2-butanol | 84 | light orange-brown. |
| Do | allyl alcohol | 91 | dark green-brown [a]. |
| Do | phenol | [b] | |
| Do | 4-chlorophenol | [b] | |

[a] Due to the tendency of O,O-diallyl hydrogen phosphorodithioate to explode if overheated, the mixtures containing allyl alcohol were maintained at 65° as a maximum temperature rather than the usual boiling water temperature.

[b] Not isolated.

[c] Traces of hydrogen chloride were detected during the filtration of this acid.

The following example illustrates the preparation of phosphinothioyl disulfides from various hydrogen phosphorodithioates prepared from the reaction of an equimolar mixture of alcohols or phenols with phosphorus pentasulfide.

EXAMPLE 2

Preparation of phosphinothioyl disulfides

One molar equivalent of the appropriate hydrogen phosphorodithioate was suspended in approximately twice its volume of water and sufficient 4–5 molar aqueous sodium hydroxide slowly added to a pH 6.0–7.0. To the nearly neutral solution was added 1.1 molar equivalents of 5.5 molar aqueous sodium nitrite solution, traces of nitrogen oxide fumes being evolved during this addition. To the solution was then slowly added 2.2 molar equivalents of 2.2 molar aqueous sulfuric acid solution, the rate of addition being regulated so as to reduce foaming to a minimum. The mixture was stirred for a total of 45 minutes from the time of the initial addition of sulfuric acid.

The organic layer was separated from the mixture and the aqueous layer extracted with ethyl ether. The organic layers were combined, washed with 10% sodium bicarbonate solution and dried over anhydrous sodium sulfate. After removal of sodium sulfate by filtration, the low-boiling materials were removed to a pot temperature of 50–60° under 1–2 mm. A list of the alcohols and phenols used in the preparation of the phosphorodithioates and yields of the disulfides obtained is given in Table II.

TABLE II.—PHOSPHINOTHIOYL DISULFIDES

| Alcohol or phenol | Alcohol or phenol | Yield Percent | Characteristics | P Analysis, Percent | |
|---|---|---|---|---|---|
| | | | | Calcd. | Found |
| methanol | ethanol | 84 | colorless | 18.0 | 17.0 |
| Do | 1-propanol | 51 | pale green | | |
| Do | 2-propanol | (a) | | | |
| Do | 1-butanol | 68 | yellow | 15.5 | 15.0 |
| Do | 2-methylpropanol-1 | 78 | pale yellow-green | 15.5 | 14.8 |
| Do | 2-butanol | 74 | do | 15.5 | 15.3 |
| ethanol | 2-propanol | 80-90 | yellow-green | | |
| Do | 2-methylpropanol-1 | 76 | pale green | 14.5 | 14.5 |
| Do | 2-butanol | 69 | pale yellow | 14.5 | 14.4 |
| Do | allyl alcohol | 74 | red-brown | | |
| Do | tetrahydrofurfuryl alcohol | 57 | viscous, yellow-orange | | |
| Do | phenol | b 63 | orange | | |
| Do | 4-chlorophenol | b 55 | orange-brown | | |
| 1-propanol | 2-butanol | 59 | yellow-green | | |
| Do | 2-propanol | 86 | do | 14.5 | 14.7 |
| 2-propanol | 1-butanol | 79 | do | | |
| Do | 2-methylpropanol-1 | 62 | pale green | | |
| Do | 2-butanol | 61 | yellow-green | | |
| Do | tetrahydrofurfuryl alcohol | 71 | viscous, yellow-brown | | |
| Do | phenol | b 27 | deep orange | | |
| Do | 4-chlorophenol | b 17 | orange-brown | | | a The product consisted of a liquid and a solid, the latter identified as bis(di-2-propoxyphosphinothioyl) disulfide.
b Yield calculated on basis of entered P₂S₅.

An alternative procedure for the preparation of the phosphinothioyl disulfides from the phosphorodithioates was accomplished as follows:

EXAMPLE 3

Two molar equivalents of the O,O-dialkyl hydrogen phosphorodithioates was suspended in 1.1 molar equivalents of 2.2 molar sulfuric acid solution. To the well-stirred acid solution was slowly added 2.2 molar equivalents of 5.5 molar sodium nitrite solution. Stirring was continued for 2–2½ hours from the time of the initial addition. The mixture was treated as in Example 2.

The bis(dialkoxyphosphinothioyl) disulfides prepared are given in Table III, listed as the alcohols used in the preparation of the phosphorodithioates.

TABLE III

| Alcohol | Alcohol | Yield Percent | Characteristics | P Analysis, Percent | |
|---|---|---|---|---|---|
| | | | | Calcd. | Found |
| methanol | allyl alcohol | 51 | yellow-brown | | |
| Do | 2,2,2-trichloroethanol | 71 | dark brown | | |
| ethanol | 2-propanol | 80-90 | yellow-green | | |
| Do | cyclohexanol | 79 | viscous yellow-green | | |
| Do | 3-pentanol | 85 | yellow-green | 13.6 | 13.5 |
| Do | 3-heptanol | 83 | do | | |
| Do | 2-hexanol | 83 | do | 12.9 | 12.1 |
| 1-propanol | 2-chloroethanol | 68 | pale yellow-green | | |
| 2-propanol | 2-chloroethanol | 83 | pale green | | |

The following example illustrates several suitable formulations for use as pesticides, the quantities of the various constituents being given in parts by weight.

EXAMPLE 4

| | Formulation 1 | Formulation 2 | Formulation 3 |
|---|---|---|---|
| Phosphinothioyl disulfide | 25 | 5 | 3-4 |
| Wetting agent | 3 | 3 | |
| Inert diluent | 72 | 92 | 96-97 |

Inerts usable in Formulation 1 would include Attaclay, silica, kaolin clay and other highly absorbent inerts. In Formulations 2 and 3, talc, calcium carbonate and similar inerts of low absorbent power would be usable. Wetting agents which have been found to be useful in formulations of this type include sodium lignosulfonates, sodium alkylnapthalene sulfonates, sodium sulfated fatty acid esters, sodium lauryl sulfate, and other wetting agents capable of lowering the surface tension of the solutions in which they are immersed.

The following example illustrates the pesticidal activities of various phosphinothioyl disulfides prepared from mixtures of alcohols or phenols.

EXAMPLE 5

The pesticide was applied to the foliage of bean plants in various concentrations in the form of an aqueous suspension of a wettable powder formulation according to Example 4, using 25 parts of phosphinothioyl disulfide, 3 parts of sodium lignosulfonate and 72 parts of Attaclay. The plants were infested with two-spotted mites, *T. bimaculatus*, or pea aphids, *M. pisi*, and observations made at intervals of 3 to 6 days to determine the mortality counts of mites or aphids.

The mortality rates in the following table are those observed 3 days after use of a spray having a concentration of active ingredient of 1250 parts per million.

The $LD_{50}$ value, which is a measure of the minimum effective concentration of the compound being tested as a toxicant was obtained in the following manner. Decreasing amounts of toxicant were applied to test surfaces. A plot was made of the percent control versus the concentration of active material in parts per million. The $LD_{50}$ value below is that concentration in parts per million at which the mortality rate is 50%.

TABLE IV.—PESTICIDAL ACTIVITIES OF PHOSPHINOTHIOYL DISULFIDES DERIVED FROM MIXTURES OF ALCOHOLS OR PHENOLS

| Alcohol or phenol | Alcohol or phenol | Mortality Rate, Percent | | $LD_{50}$ | |
|---|---|---|---|---|---|
| | | Mites | Aphids | Mites | Aphids |
| methanol | ethanol | 95 | | 21 | 230 |
| Do | 1-propanol | 95 | | | |
| Do | 2-propanol | 100 | 100 | 38 | 625 |
| Do | 1-butanol | 99 | | | |
| Do | 2-butanol | 100 | | | |
| Do | 2-methylpropanol-1 | 97 | | | |
| Do | allyl alcohol | 100 | | 60 | |
| ethanol | 2-propanol | 100 | 100 | 12 | 125 |
| Do | 2-methylpropanol-1 | 100 | | | |
| Do | 2-butanol | 100 | | | |
| Do | allyl alcohol | 100 | | | |
| Do | cyclohexanol | 85 | | | |
| Do | 3-pentanol | 99 | | 156 | |
| Do | 3-heptanol | 43 | | | |
| Do | 2-hexanol | 91 | | | |
| Do | phenol | 31 | | | |
| DO | 4-chlorophenol | 33 | | | |
| 1-propanol | 2-butanol | 13 | | | |
| Do | 2-chloroethanol | 100 | | 156 | |
| Do | 2-propanol | 100 | | | |
| 2-propanol | 1-butanol | 16 | | | |
| Do | 2-methylpropanol-1 | 75 | | | |
| Do | 2-butanol | 17 | | | |
| Do | 2-chloroethanol | 99 | | | |
| Do | phenol | 22 | | | |
| Do | 4-chlorophenol | 39 | | | |

The increased pesticidal activity of the phosphinothioyl disulfides having different ester groups over those in which all the ester groups are the same is brought out by the following example.

EXAMPLE 6

The pesticidal activity of various bis(dialkoxyphosphinothioyl) disulfides was determined and compared to the activity of bis(diethoxyphosphinothioyl) disulfide and the ratio of the activity of the disulfide, X, to the activity of bis(diethoxyphosphinothioyl) disulfide recorded in Table V.

TABLE V

| X | Activity Ratio | |
|---|---|---|
| | Mites | Aphids |
| bis(diethoxyphosphinothioyl) disulfide | 1.0 | 1.0 |
| bis(di-2-propoxyphosphinothioyl) disulfide | <0.1 | <0.1 |
| bis(dialkoxyphosphinothioyl) disulfide derived from equimolar mixture of ethanol and 2-propanol | 2.0 | 1.4 |
| bis(dialkoxyphosphinothioyl) disulfide obtained by oxidation of an equimolar mixture of O,O-diethyl and O,O-di-2-propyl hydrogen phosphorodithioate | 1.0 | 1.4 |

The effect upon the pesticidal activity of the bis(dialkoxyphosphinothioyl) disulfides produced by varying the ratios of the alcohols used in their preparation is indicated by the following example.

EXAMPLE 7

The disulfide derived from ethyl alcohol and 2-propyl alcohol was prepared using the ratios of the alcohols shown in Table VI. The pesticidal activity of the compounds thus prepared was compared to the activity of the disulfide prepared from an equimolar mixture of ethyl alcohol and 2-propyl alcohol and the ratio of the pesticidal activity of these compounds to the pesticidal activity of the 1:1 compound recorded in Table VI.

TABLE VI

| Ratio of alcohols Ethyl:2-Propyl | Activity Ratio | |
|---|---|---|
| | Mites | Aphids |
| 1:1 | 1.0 | 1.0 |
| 2:1 | 1.0 | 1.1 |
| 3:1 | 2.0-2.4 | 1.8 |
| 4:1 | 1.4-2.2 | 1.1 |
| 6:1 | 1.5-1.6 | 1.4 |

The foregoing examples illustrate several modes of carrying out this invention, but are not intended to be exhaustive of the possibilities which may occur to those skilled in the art. Disulfides having a greater variety of alkoxy or phenoxy groups than those indicated in the examples, for instance, may be used without departing from the scope of this invention.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. The phosphinothioyl disulfide composition of the formula

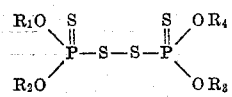

where $R_1$, $R_2$, $R_3$ and $R_4$ are selected from the group consisting of ethyl and isopropyl radicals, produced by reacting phosphorus pentasulfide with the mixture of ethanol and isopropanol wherein said alcohols are present in the ratio of three moles of ethanol per mole of isopropanol to form a mixture of hydrogen phosphorodithioates, and oxidizing said mixture of phosphorodithioates to produce said phosphinothioyl disulfide composition.

2. The phosphinothioyl disulfide composition of the formula

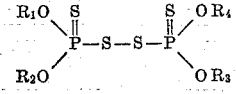

wherein $R_1$, $R_2$, $R_3$ and $R_4$ are selected from the group consisting of ethyl and isopropyl radicals, produced by reacting phosphorus pentasulfide with the mixture of ethanol and isopropanol wherein said alcohols are present in the ratio of three of six moles of ethanol per mole of isopropanol to form a mixture of hydrogen phosphorodithioates, and oxidizing said mixture of phosphorodithioates to produce said phosphinothioyl disulfide composition.

3. The method of controlling mite pests which comprises applying to the infested area a toxic amount and concentration of a phosphinothioyl disulfide of the formula

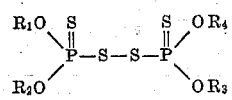

wherein $R_1$, $R_2$, $R_3$ and $R_4$ are selected from the group consisting of ethyl and isopropyl radicals, said composition produced by reacting phosphorus pentasulfide with the mixture of ethanol and isopropanol wherein said alcohols are present in the ratio of three moles of ethanol per mole of isopropanol to form a mixture of hydrogen phosphorodithioates, and oxidizing said mixture of phosphorodithioates to produce said phosphinothioyl disulfide composition.

4. The method of controlling mite pests which comprises applying to the infested area a toxic amount and concentration of a phosphinothioyl disulfide composition of the formula

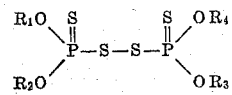

wherein $R_1$, $R_2$, $R_3$ and $R_4$ are selected from the group consisting of ethyl and isopropyl radicals, said composition produced by reacting phosphorus pentasulfide with the mixture of ethanol and isopropanol wherein said alcohols are present in the ratio of three to six moles of ethanol per mole of isopropanol to form a mixture of hydrogen phosphorodithioates, and oxidizing said mixture of phosphorodithioates to produce said phosphinothioyl disulfide composition.

References Cited in the file of this patent

UNITED STATES PATENTS

| | | |
|---|---|---|
| 1,763,851 | Johnson | June 17, 1930 |
| 1,763,852 | Johnson | June 17, 1930 |
| 2,060,815 | MacAfee | Nov. 17, 1936 |
| 2,471,115 | Mikeska | May 24, 1949 |
| 2,523,147 | Dean et al. | Sept. 19, 1950 |
| 2,526,497 | Mikeska | Oct. 17, 1950 |
| 2,705,694 | Bartlett | Apr. 5, 1955 |
| 2,798,880 | Williams et al. | July 9, 1957 |

UNITED STATES PATENT OFFICE
CERTIFICATE OF CORRECTION

Patent No. 2,983,644                                 May 9, 1961

Joe R. Willard et al.

It is hereby certified that error appears in the above numbered patent requiring correction and that the said Letters Patent should read as corrected below.

Column 8, line 17, for "of six moles" read -- to six holes --.

Signed and sealed this 3rd day of October 1961.

(SEAL)
Attest:

ERNEST W. SWIDER                                DAVID L. LADD
Attesting Officer                                  Commissioner of Patents

USCOMM-DC